United States Patent [19]
Modzelewski

[11] Patent Number: 5,842,657
[45] Date of Patent: Dec. 1, 1998

[54] SEAT BELT WEBBING PRETENSIONER

[75] Inventor: Thomas Modzelewski, Brighton, Mich.

[73] Assignee: TRW Inc., Lyndhurst, Ohio

[21] Appl. No.: 911,784

[22] Filed: Aug. 15, 1997

[51] Int. Cl.[6] .................................................. B60R 22/46
[52] U.S. Cl. ............................................ 242/374; 60/632
[58] Field of Search ........................... 242/374; 280/806;
297/478, 480; 60/632

[56] References Cited

U.S. PATENT DOCUMENTS

| | | | |
|---|---|---|---|
| 3,766,803 | 10/1973 | Ball, Jr. et al. ........................... | 74/625 |
| 4,191,344 | 3/1980 | Tillac ...................................... | 242/374 |
| 5,033,270 | 7/1991 | Hardt ....................................... | 60/632 |
| 5,443,222 | 8/1995 | Modinger, et al. ..................... | 242/374 |

OTHER PUBLICATIONS

Article entitled "Introduction to a new Pressure Transducer Technology", 9 pages.

Primary Examiner—John M. Jillions
Attorney, Agent, or Firm—Tarolli, Sundheim, Covell, Tummino & Szabo

[57] ABSTRACT

A vehicle seat belt webbing retractor (10) including a pretensioner (61), includes a length of seat belt webbing (16) and a spool (50) on which the seat belt webbing is wound. The spool (50) is rotatable in a belt retraction direction (56) and in an opposite belt withdrawal direction (58). The retractor (10) includes a member (70) having a chamber (100), a fixed portion (98), and a movable portion (88). The fixed portion (98) of the member (70) is fixed in position relative to the spool (50). The member (70) has a first condition in which the movable portion (88) of the member is twisted in a first direction of rotation about an axis (72) relative to the fixed portion (98) of the member. The movable portion (88) of the member (70) untwists in a second direction of rotation about the axis (72) relative to the fixed portion (98) of the member in response to the introduction of fluid under pressure into the chamber (100) of the member. The retractor (10) includes a mechanism (64, 66, 68) for transmitting torque from the movable portion (88) of the member (70) to the spool (50) to effect rotation of the spool in the belt retraction direction (56).

5 Claims, 3 Drawing Sheets

SEAT BELT WEBBING PRETENSIONER

BACKGROUND OF THE INVENTION

1. Technical Field

The present invention relates to a vehicle seat belt webbing pretensioner. In particular, the present invention relates to a vehicle seat belt webbing retractor including a pretensioner for rotating the spool of the retractor to remove slack from the seat belt webbing in the event of a vehicle collision.

2. Description of the Prior Art

A typical vehicle seat belt system includes a length of belt webbing wound on a belt webbing spool of a seat belt webbing retractor. The belt webbing is extensible about a vehicle occupant to restrain the occupant. The belt webbing spool rotates in a belt withdrawal direction as the occupant withdraws belt webbing from the retractor. A rewind spring is connected with the belt webbing spool and biases the belt webbing spool for rotation in an opposite belt retraction direction.

The seat belt webbing may sometimes become slack around the vehicle occupant. It is known to use a pretensioner to rotate the spool of the retractor in the belt retraction direction to remove slack from the seat belt webbing in the event of a vehicle collision.

SUMMARY OF THE INVENTION

The present invention is a vehicle seat belt webbing retractor including a pretensioner, comprising a length of seat belt webbing and a spool on which the seat belt webbing is wound. The spool is rotatable in a belt retraction direction and in an opposite belt withdrawal direction. The retractor includes a member having a chamber. The member has a fixed portion and a movable portion. The retractor includes means for fixing the fixed portion of the member in position relative to the spool. The member has a first condition in which the movable portion of the member is twisted in a first direction of rotation about the axis relative to the fixed portion of the member. The movable portion of the member untwists in a second direction of rotation about the axis relative to the fixed portion of the member in response to the introduction of fluid under pressure into the chamber of the member. The retractor includes means for transmitting torque from the movable portion of the member to the spool to effect rotation of the spool in the belt retraction direction.

BRIEF DESCRIPTION OF THE DRAWINGS

Further features of the present invention will become apparent to one skilled in the art to which the present invention relates from reading the following specification with reference to the accompanying drawings, in which.

DESCRIPTION OF PREFERRED EMBODIMENTS

The present invention relates to a vehicle seat belt webbing pretensioner. In particular, the present invention relates to a vehicle seat belt webbing retractor including a pretensioner for rotating the spool of the retractor to remove slack from the seat belt webbing in the event of a vehicle collision. The present invention is applicable to various retractor constructions.

Figure 1:
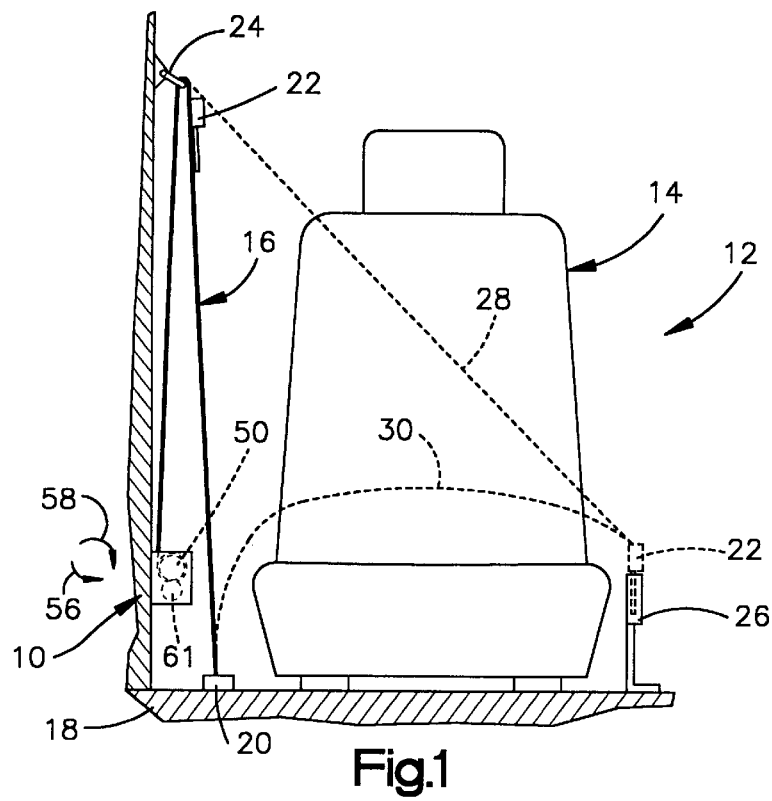
FIG. 1 is a schematic illustration of a vehicle seat belt system including a seat belt retractor and a pretensioner constructed in accordance with the present invention.

As representative of the present invention, FIG. 1 illustrates a seat belt webbing retractor 10. The retractor 10 is incorporated in a three-point continuous loop seat belt system 12 for use in restraining an occupant of a vehicle.

During operation of the vehicle, the occupant of the vehicle sits on a seat 14 which is illustrated as a front passenger seat in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The retractor 10 (FIGS. 2–3) includes a frame 40 which is fixed to the vehicle body 18 in a manner not shown. The frame 40 is a single piece of sheet metal stamped and formed to a U-shaped configuration. The frame 40 includes a back wall 42 and spaced, parallel side walls 44 and 46 which extend generally perpendicular to the back wall.

The retractor 10 also includes a belt webbing spool 50. The seat belt webbing 16 is wound on the belt webbing spool 50. A shaft 52 extends through the belt webbing spool 50 and is fixed for rotation with the belt webbing spool. The shaft 52 supports the belt webbing spool 50 on the frame 40 for rotation about a belt webbing spool axis 54 relative to the frame in a belt retraction direction 56 (FIG. 1) and in an opposite belt withdrawal direction 58. A rewind spring assembly (not shown) biases the belt webbing spool 50 for rotation in the belt retraction direction 56.

The retractor also includes known means (not shown), such as spool locking ratchet wheels and a lock bar, for blocking rotation of the belt webbing spool 50 in the belt withdrawal direction 58 in the event of either or both of (a) sudden vehicle deceleration such as occurs in a vehicle collision and (b) withdrawal of belt webbing 16 from the belt webbing spool at a rate exceeding a predetermined rate. The retractor 10 may also include a cinch mechanism (not shown) for selectively moving the lock bar into engagement with the spool locking ratchet wheels.

The retractor 10 includes a pretensioner 61 for rotating the spool 50 in the belt retraction direction 56 to remove slack from the seat belt webbing 16 in the event of a vehicle collision. The pretensioner 61 includes a rotary actuator mechanism 62 and an output shaft 64 (described below in detail) for receiving the torque of the rotary actuator mechanism. The pretensioner 61 also includes a transmission or force multiplier 66 and a clutch 68 for selectively connecting the output shaft 64 with the transmission.

The rotary actuator mechanism 62 (FIG. 2) includes a twist-tube actuator 70 having a portion which, when pressurized, rotates about its axis 72 and produces an output torque for rotating the output shaft 64. The rotary actuator mechanism 62 also includes a fluid source in the form of a pyrotechnic device 74 for pressurizing the twist-tube actuator 70.

Figures 4, 5, 7, 8:
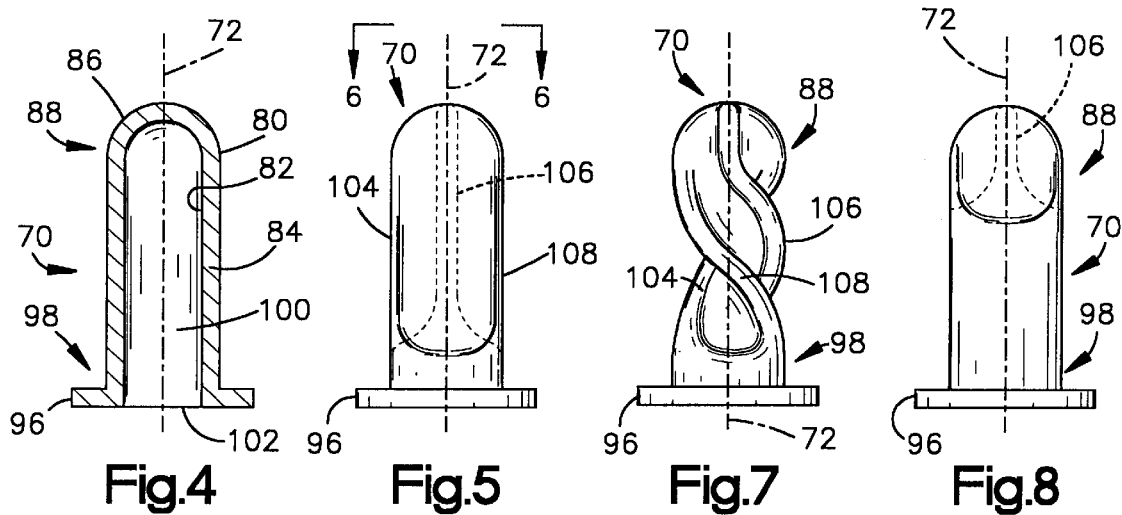
FIG. 4 is a sectional view of a twist-tube actuator which forms a part of the pretensioner of FIG. 2.
FIG. 5 is an elevational view of the twist-tube actuator of FIG. 4 shown in one condition.
FIG. 7 is an elevational view of the twist-tube actuator of FIG. 4 shown in a second, twisted, condition.
FIG. 8 is an elevational view of the twist-tube actuator of FIG. 4 shown in an actuated, untwisted, condition.

The twist-tube actuator 70 is a hollow metal member initially formed with a cylindrical tubular configuration as shown in FIG. 4. The twist-tube actuator 70 is preferably made as one piece from a plastically deformable material such as steel. The twist-tube actuator 70 has an outer side surface 80 and an opposite inner side surface 82.

The twist-tube actuator 70 has a cylindrical side wall 84 centered on the axis 72 and a domed end wall 86 which closes the side wall. The end wall 86 forms a part of a first end portion or free end portion 88 of the twist-tube actuator 70.

The twist-tube actuator 70 has a mounting flange 96 at the axial end of the side wall 84 opposite the end wall 86. The mounting flange 96 has an annular configuration and extends radially outward from the side wall 84. The mounting flange 96 forms a part of a second end portion or fixed end portion 98 of the twist-tube actuator 70.

The side wall 84 and the end wall 86 of the twist-tube actuator 70 define a chamber 100 in the twist-tube actuator. When the twist-tube actuator 70 is in the condition shown in FIG. 4, the chamber 100 has a first volume. The chamber 100 is accessible through an opening 102 in the twist-tube actuator 70 radially inward of the mounting flange 96.

Figure 6:
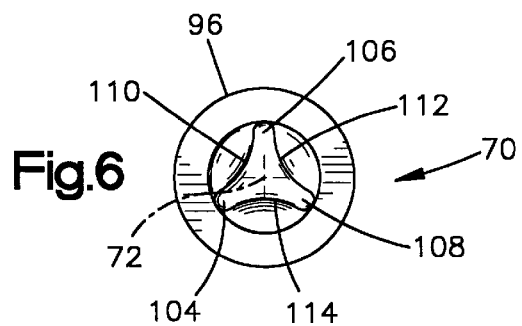
FIG. 6 is an end view of the twist-tube actuator of FIG. 5 taken along line 6—6 of FIG. 5.

During manufacture of the rotary actuator mechanism 62, the twist-tube actuator 70 is initially shaped into the fluted condition shown in FIGS. 5 and 6. Specifically, the material of the side wall 84 of the twist-tube actuator 70 and of the end wall 86 is deformed inwardly, toward the axis 72, to form three axially extending flutes 104, 106 and 108 separated by three indented portions 110, 112 and 114 of the twist-tube actuator. The flutes 104–108 are spaced apart at equal circumferential angles about the axis 72. The flutes 104–108 are linear in configuration.

In a subsequent step of manufacture of the rotary actuator mechanism 62, the twist-tube actuator 70 is formed from the fluted condition shown in FIGS. 5 and 6 to a "twisted" condition shown in FIG. 7. Specifically, the first end portion 88 of the twist-tube actuator 70 is twisted in a first direction of rotation about the axis 72, relative to the second end portion 98 of the twist-tube actuator.

As this twisting action occurs, each one of the three flutes 104–108 assumes a generally helical configuration as shown in FIG. 7. As this twisting action occurs, the volume of the chamber in the twist-tube actuator 70 decreases to a second volume which is less than the first volume. The deformation of the material of the twist-tube actuator 70 is plastic deformation. The twist-tube actuator 70 remains in this twisted condition as shown in FIG. 7 until the pyrotechnic device 74 is actuated as described below.

Figure 2:
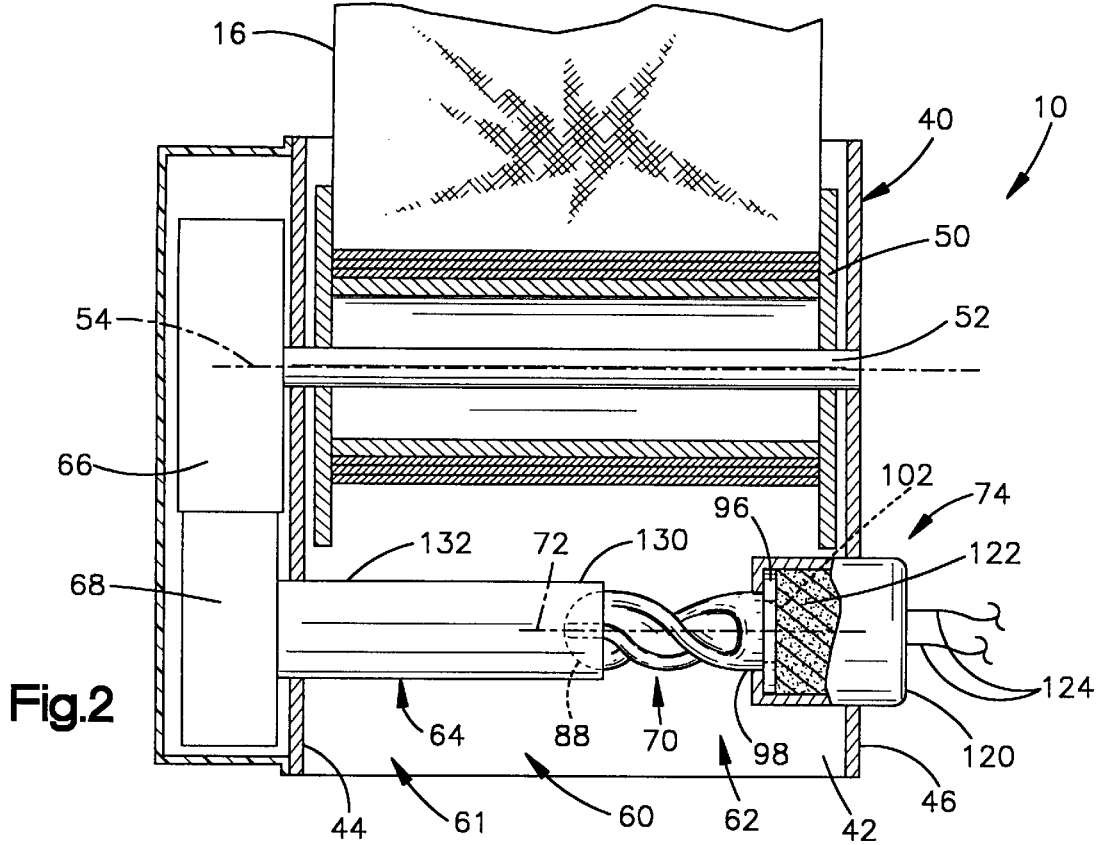
FIG. 2 is a longitudinal view partially in section of the retractor of FIG. 1, showing the pretensioner prior to actuation.
Figure 3:
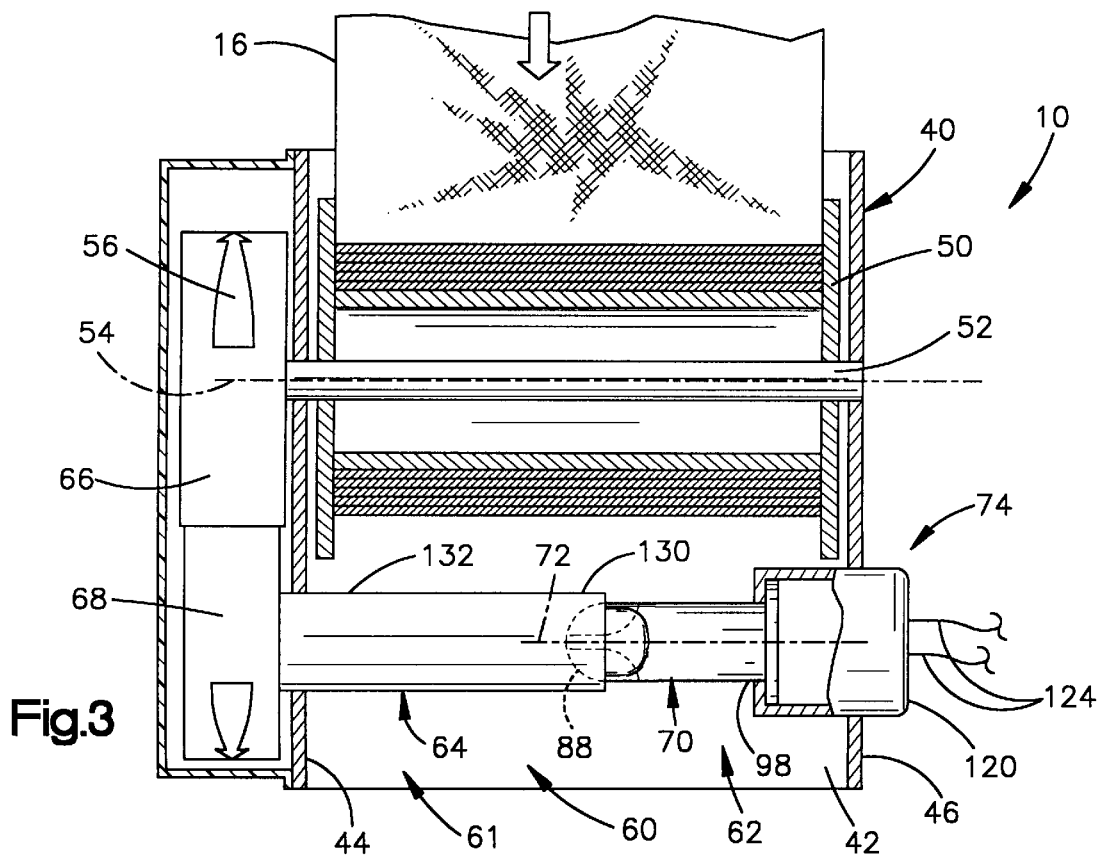
FIG. 3 is a view similar to FIG. 2, showing the pretensioner in an actuated condition.

The twist-tube actuator 70 is next connected with the pyrotechnic device 74 (FIG. 2). The mounting flange 96 of the twist-tube actuator 70 is received inside a housing 120 of the pyrotechnic device 74. The housing 120 encloses a known pyrotechnic material 122 which combusts when energized by an electric current flowing over lead wires 124. The pyrotechnic material 122 is disposed adjacent to and in fluid communication with the opening 102 in the twist-tube actuator 70.

The rotary actuator mechanism 62 is thereafter connected in a torque-transmitting relationship with the output shaft 64 in the pretensioner 60. The first end portion 88 of the twist-tube actuator 70 serves as a connection portion which connects the twist-tube actuator with the output shaft 64. The output shaft 64 has a first end portion 130 which extends over and engages the connection portion 88 of the twist-tube actuator 70 in a torque-transmitting relationship.

A second end portion 132 of the output shaft 64 is connected with the clutch 68. The clutch 68 is a known mechanism operable selectively to couple the rotary actuator mechanism 62 to the transmission 66. The clutch 68 may be, for example, an inertia-responsive mechanism which engages under centrifugal force resulting from rapid rotation of the output shaft 64. Engagement of the clutch 68 results in the transmission of torque from the output shaft 64 to the transmission 66. The specific structure of the clutch 68, because it does not form a part of this invention, is not shown.

When the pretensioner 61 is not actuated, that is, prior to actuation of the rotary actuator mechanism 62, the clutch 68 is disengaged. The spool 50 of the retractor 10 is uncoupled from the rotary actuator mechanism 62.

The transmission 66 is a known mechanism for rotating the spool 50 a desired number of times in response to the predetermined amount of rotation of the first end portion 88 of the twist-tube actuator 70. The transmission 66 may include, for example, a gear train for causing the spool 50 to rotate at a faster rate than the first end portion 88 of the twist-tube actuator 70. For example, it may be desirable to rotate the spool 50 from one to three rotations in the belt retraction direction 56 in order to pretension the belt webbing 16 the desired amount. The output of the transmission 66 is connected with the retractor shaft 52. The specific structure of the transmission 66, because it does not form a part of this invention, is not shown.

In normal driving conditions the retractor 10 is in a non-pretensioning mode. The pretensioner 61 is in the unactuated condition shown in FIG. 2. The pyrotechnic device 74 is not actuated. The twist-tube actuator 70 is in the twisted condition shown in FIGS. 2 and 7.

Upon detection of a vehicle collision, an electric signal is sent to the pyrotechnic device 74 over the lead wires 124. The pyrotechnic material 122 combusts and produces combustion products under pressure. The pressurized combustion products flow rapidly through the opening 102 in the twist-tube actuator 70 into the chamber 100 in the twist-tube actuator.

The sudden increase of pressure in the twist-tube actuator 70 causes the material of the twist-tube actuator to deform. The side wall 84 of the twist-tube actuator 70 expands radially outward. As the twist-tube actuator 70 expands, the volume of the chamber 100 in the twist-tube actuator increases to a third volume, greater than the second volume but less than the first volume.

The twist-tube actuator 70, as it expands, moves from the condition shown in FIG. 7 to the condition shown in FIG. 8. As the twist-tube actuator 70 expands, the flutes 104–108 of the side wall 84 straighten and expand. The first end portion 88 of the twist-tube actuator 70 rotates about the axis 72, relative to the fixed second end portion 98 of the twist-tube actuator. The first end portion 88 of the twist-tube actuator 70 rotates in a second direction of rotation about the axis 72, opposite the first direction of rotation.

The side wall 84 of the twist-tube actuator 70, for most of the axial length of the twist-tube actuator, expands outward into a cylindrical configuration. The remaining portion of the twist-tube actuator 70 retains the fluted configuration with three linear flutes. This deformation of the material of the twist-tube actuator 70 is plastic deformation. The twist-tube actuator 70 remains in this untwisted condition as shown in FIG. 8.

As the twist-tube actuator 70 expands and untwists, the torque of the rotating end portion 88 is transmitted from the twist-tube actuator 70 to the output shaft 64. The output shaft 64 is driven to rotate in the same direction of rotation as the first end portion 88 of the twist-tube actuator 70. The torque of the rotating output shaft 64 is transmitted into the clutch 68. The clutch 68 engages and transmits torque from the output shaft 64 into the transmission 66. This torque is applied to the retractor shaft 52, causing the retractor spool 50 to rotate in the belt retraction direction 56.

The retractor spool 50 rotates the desired number of rotations in the belt retraction direction 56. The desired amount of seat belt webbing 16 is wound on the spool 50, taking slack out of the torso portion 28 of the seat belt webbing and helping to protect the vehicle occupant.

Figure 9:
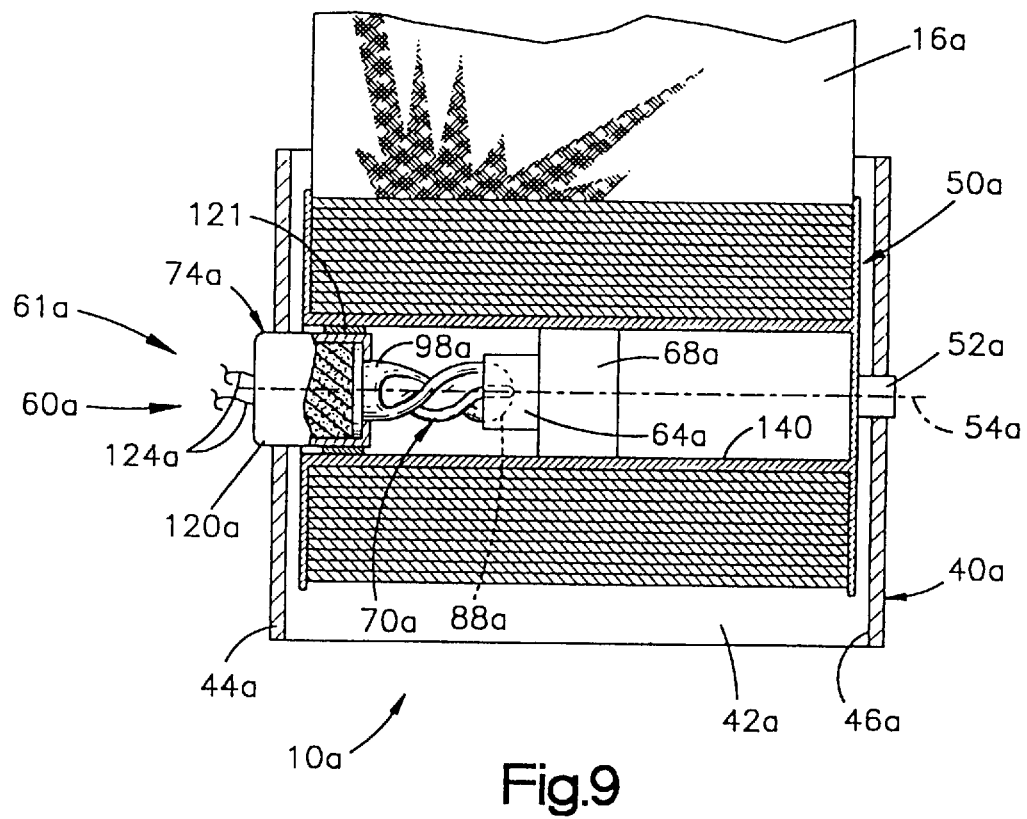
FIG. 9 is a view similar to FIG. 2 of a seat belt retractor including a pretensioner constructed in accordance with a second embodiment of the present invention.

FIG. 9 illustrates a retractor 10a constructed in accordance with a second embodiment of the present invention. The retractor 10a is generally similar in construction to the retractor 10 (FIGS. 1–8). Parts of the retractor 10a which are the same as or similar to parts of the retractor 10 are given the same reference numerals with the suffix "a" added for clarity.

The retractor 10a has a more compact construction in which the pretensioner 61a is located generally within the spool 50a. The pyrotechnic device 74a is mounted in the side wall 44a of the frame 40a, at a location centered on the spool axis 54a. The housing 120a of the pyrotechnic device 74a supports one end of the spool 50a via a bearing 121 for rotation relative to the pyrotechnic device 74a and to the frame 40a. Alternatively, the spool 50a may be supported on the frame side wall 44a.

The output shaft 64a of the pretensioner 61a is connected with a clutch indicated schematically at 68a. The clutch 68a is in engagement with an inner cylindrical surface 140 on the spool 50a. The pretensioner 61a may also include a transmission (not shown) as part of the means for transmitting the output torque of the twist-tube actuator 70a to the spool 50a.

Operation of the pretensioner 61a is similar to operation of the pretensioner 61. In the event of a vehicle collision, an electric signal over lead wires 124a actuates the pyrotechnic device 74a. The combustion products of the pyrotechnic device 74a flow into the twist-tube actuator 70a. The twist-tube actuator 70a expands and untwists. As the twist-tube actuator 70a untwists, the free end portion 88a of the twist-tube actuator rotates about the spool axis 54a relative to the fixed end portion 98a of the twist-tube actuator.

The rotation of the free end portion 88a of the twist-tube actuator 70a is transmitted through the output shaft 64a and the clutch 68a into the spool 50a. The spool 50a rotates at least once about the spool axis 54a in the belt retraction direction. This rotation of the spool 50a pretensions the belt webbing 16a as desired.

From the above description of the invention, those skilled in the art will perceive improvements, changes and modifications in the invention. Such improvements, changes and modifications within the skill of the art are intended to be covered by the appended claims.

Having described the invention, I claim:

1. A vehicle seat belt webbing retractor including a pretensioner, said retractor comprising:

a length of seat belt webbing;

a spool on which said seat belt webbing is wound, said spool being rotatable in a belt retraction direction and in an opposite belt withdrawal direction;

a member having a chamber, a fixed portion at one end of said member, and a movable portion at the other end of said member, said chamber and said fixed and movable portions being centered on an axis;

said member having a first condition in which said movable portion of said member is twisted in a first direction of rotation about said axis relative to said fixed portion of said member;

said movable portion of said member untwisting in a second direction of rotation about said axis relative to said fixed portion of said member in response to the introduction of fluid under pressure into said chamber of said member; and means for transmitting torque from said movable portion of said member to said spool to effect rotation of said spool in the belt retraction direction.

2. A retractor as set forth in claim 1 wherein the volume of said chamber increases when said movable portion of said member untwists from the first condition in response to the introduction of fluid under pressure into said chamber.

3. A retractor as set forth in claim 1 wherein said means for transmitting torque comprises an output shaft connected with said movable portion of said member, a transmission for rotating said spool, and a clutch for selectively connecting said output shaft with said transmission.

4. A retractor as set forth in claim 1 further comprising a pyrotechnic device for producing combustion products under pressure which flow rapidly into said chamber in said member to pressurize and expand said member and to rotate said movable portion of said member about said axis relative to said fixed portion of said member.

5. A retractor as set forth in claim 1 wherein said member has a plurality of axially extending flutes spaced apart about said axis, said flutes having a generally helical configuration when said member is in the unexpanded condition, said flutes straightening and expanding in response to the introduction of fluid under pressure into said chamber of said member, said movable portion of said member comprising at least a portion of said flutes.

* * * * *